Jan. 1, 1924. 1,479,479
H. OSSWALD
ROLL FEED MECHANISM FOR POWER PRESSES
Filed Jan. 26, 1922
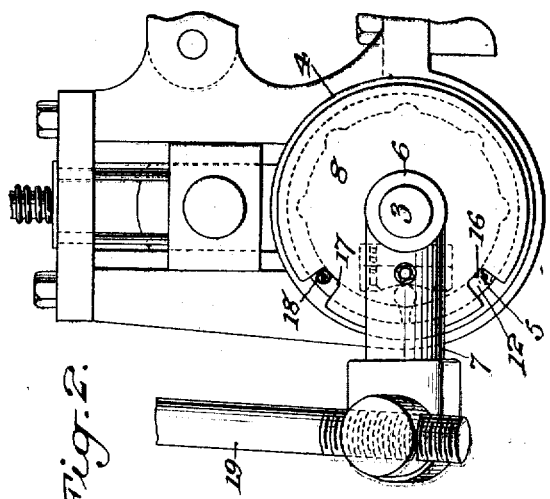
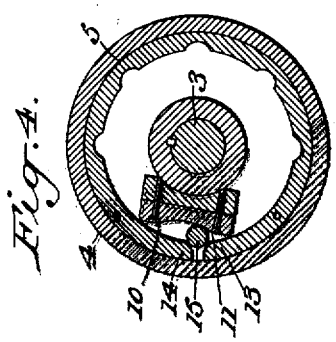
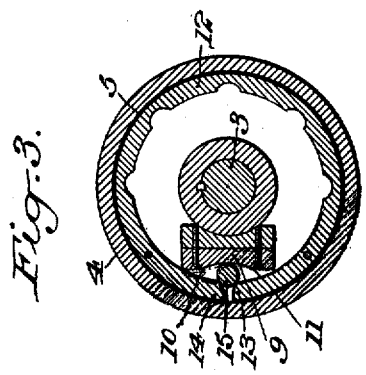
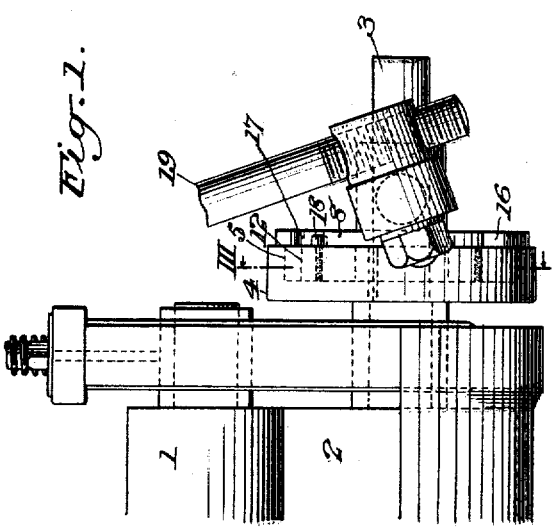
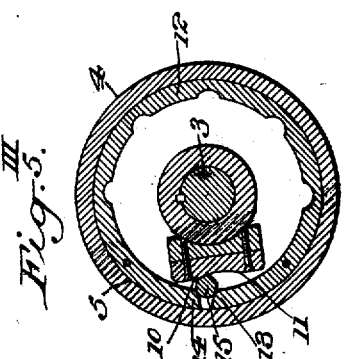
Inventor:-
Herman Osswald
by attorneys Patented Jan. 1, 1924.

1,479,479

UNITED STATES PATENT OFFICE.

HERMAN OSSWALD, OF GLENDALE, NEW YORK.

ROLL-FEED MECHANISM FOR POWER PRESSES.

Application filed January 26, 1922. Serial No. 531,929.

*To all whom it may concern:*

Be it known that I, HERMAN OSSWALD, a citizen of the United States, and resident of Glendale, in the county of Queens and State of New York, have invented a new and useful Improvement in Roll-Feed Mechanism for Power Presses, of which the following is a specification.

My invention consists in a friction roll feed mechanism especially adapted for attachment to power presses, whereby intermittent rotary movement of the feed rolls is accomplished.

The object of my invention is to provide a friction clutch located between the rotary feed roll member and its oscillating driving member, which clutch will impart an intermittent rotary movement to the feed roll without liability of slipping, said clutch being quiet, powerful and positive in its action and quickly and readily reversible for driving the feed rolls in either direction.

A further object is to provide certain improvements in the construction, form and arrangement of the several parts whereby the object above set forth may be accomplished.

A practical embodiment of my invention is represented in the accompanying drawings, in which—

Fig. 1 represents in front elevation a portion of a roll feed for power presses, with my friction roll feed mechanism applied thereto.

Fig. 2 represents a side view of the same.

Fig. 3 represents a section taken in the plane of the line III—III of Fig. 1.

Fig. 4 represents a similar section with the parts in the position they assume when clutched in one direction.

Fig. 5 represents a similar view with the parts in the position they assume when clutched in the opposite direction.

The upper and lower feed rolls for the material are denoted by 1 and 2 and they are suitably mounted in the usual manner. The lower feed roll shaft 3 has fixed thereto the driven member 4 of the clutch, which member is provided with a flange having a circular inner wall 5 spaced from and concentric with the axis of the feed roll shaft 3. The hub 6 of the oscillating operating lever 7, which forms the driving member, is loosely mounted upon the feed roll shaft 3, which lever is provided with a disc portion 8 covering the open side of the driven member 4 of the clutch. This driving member carries a double cam 9, the oppositely inclined surfaces of which are denoted by 10 and 11 respectively.

A normally contracted split clutch ring 12 is located within the driven member 4 of the clutch, in close proximity to the circular inner wall 5 thereof. The adjacent ends of this split ring are preferably beveled as shown at 13, 14, and a clutch roller 15 is located between the double cam 9 and the said adjacent ends of the split ring. With the parts in their normal position as shown in Figs. 1, 2 and 3, the clutch is released.

The disc portion 8 of the oscillating operating lever which forms the driving member of the clutch is provided with two peripheral recesses 16, 17, exposing portions of the split clutch ring 12. In these exposed portions of the clutch ring I provide holes for the reception of a screw or pin 18 which serves as a removable stop to coact with the wall of either one of the recesses in the disc portion 8 of the operating lever, to act as a lost motion connection between the split ring and driving member, and to insure the proper positioning of the split ring on each return stroke of the driving member. When this stop 18 is in the position shown in Fig. 2, the parts are adjusted for driving the feed rolls intermittently in one direction and when this stop is in the other position in the recess 16, the parts are adjusted for the intermittent movement of the feed rolls in the opposite direction.

The lever 7 may be oscillated by any suitable means, not shown herein, through the connecting rod 19.

The operation of the friction roll feed mechanism is as follows:—

Presupposing the parts to be in the positions shown in Figs. 1, 2 and 3; as the operating lever 7 is started on its upward movement, the inclined surface 11 of the double cam 9 will force the roller 15 outwardly, thereby expanding the split ring 12 into frictional engagement with the circular inner wall 5 of the driven member 4. The lost motion connection between the lever 7 and the split ring 12, through the stop 18, serves to keep the adjacent ends of the split ring properly positioned with respect to the cam at all times.

If it be desired to reverse the intermittent rotary movement of the feed rolls, the stop 18 is removed from its position shown in Fig. 2, within the recess 17 to its position shown in dotted lines in the recess 16. The downward movement of the operating lever 7 from the position shown in Fig. 2 will cause the inclined portion 10 to force the clutch roller 15 outwardly to expand the ring 12 into frictional engagement with the circular inner wall 5 of the feed roll member 4.

From the above description it will be seen that I have provided a friction clutch device for imparting a predetermined intermittent rotary movement to the feed rolls in either direction, which device has a very extended gripping surface, thus rendering it powerful in its action and preventing any liability of slippage, the device at the same time being noiseless.

It is evident that various changes may be made in the construction, form and arrangement of the several parts without departing from the spirit and scope of my invention, hence, I do not wish to be limited to the particular embodiment herein shown and described, but

What I claim is:—

1. A roll feed mechanism comprising driving and driven members, a friction clutch for converting the oscillating movement of the driving member into an intermittent rotary movement of the driven member, said clutch comprising a cam carried by the driving member, a normally contracted split ring, a roller located between the face of the cam and the ends of the split ring whereby the movement of the cam away from its normal position will cause the roller to expand the split ring into clutching engagement with the driven member, and a lost motion connection between the split ring and driving member.

2. A roll feed mechanism comprising driving and driven members, a friction clutch for converting the oscillating movement of the driving member into an intermittent rotary movement of the driven member, said clutch comprising a double cam carried by the driving member, a normally contracted split ring, a roller located between the cam and the ends of the split ring, whereby the movement of the cam away from its normal position in either direction will cause the roller to expand the split ring into frictional engagement with the driven member, and a reversible lost motion connection between the split ring and driving member.

3. A feed roll, its shaft, a driving member loosely mounted thereon, a driven member fast on said shaft, a friction clutch for converting the oscillating movement of the driving member into an intermittent rotary movement of the driven member, said clutch including a flange on the driven member having a circular inner wall, a normally contracted split ring located in proximity to said wall, a cam carried by the driving member, and a roller interposed between the cam and the ends of the split ring, whereby the movement of the cam away from its normal position will cause the roller to expand the split ring into frictional engagement with the adjacent wall of the driven member, said driving member being provided with a disc portion having a peripheral recess and said split ring being provided with a stop located in said recess forming a lost motion connection between the ring and driving member.

4. A feed roll, its shaft, a driving member loosely mounted thereon, a driven member fast on said shaft, a friction clutch for converting the oscillating movement of the driving member into an intermittent rotary movement of the driven member, said clutch including a flange on the driven member having a circular inner wall, a normally contracted split ring located in proximity to said wall, a double cam carried by the driving member, and a roller interposed between the cam and the ends of the split ring, whereby the movement of the cam away from its normal position in either direction will cause the roller to expand the split ring into frictional engagement with the circular wall of the driven member, said driving member being provided with a disc portion having two peripheral recesses and said split ring having a removable stop arranged to be located in one or the other of said recesses to form a lost motion connection between the ring and driving member.

In testimony, that I claim the foregoing as my invention, I have signed my name this 20th day of January, 1922.

HERMAN OSSWALD.